Aug. 2, 1955     H. DRUBIG ET AL     2,714,694
RECTIFIER-STACK

Filed Feb. 20, 1952     2 Sheets-Sheet 1

INVENTORS
H. DRUBIG - J. EISELE -
G. STRATTNER - G. PAROW
BY *R.P. Morris*
ATTORNEY Aug. 2, 1955
H. DRUBIG ET AL
2,714,694
RECTIFIER-STACK
Filed Feb. 20, 1952
2 Sheets-Sheet 2
Fig. 7
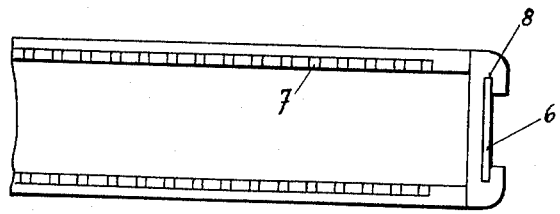
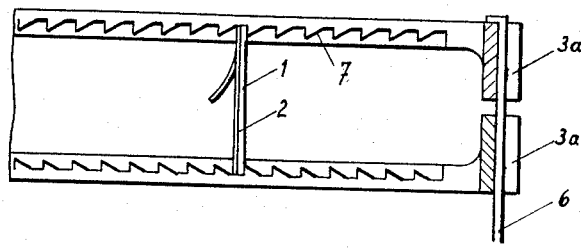
Fig. 8
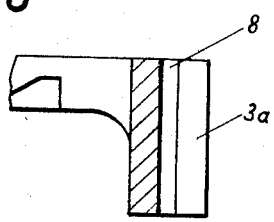
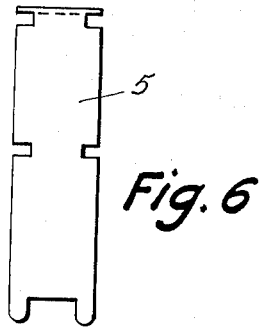
Fig. 6
Fig. 9
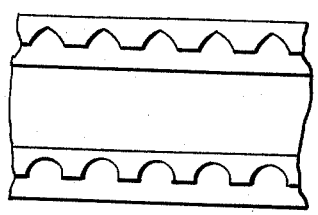
Fig. 10
INVENTORS
H.DRUBIG - J.EISELE -
G.STRATTNER - G.PAROW
BY
ATTORNEY

United States Patent Office 2,714,694
Patented Aug. 2, 1955

2,714,694
RECTIFIER-STACK

Horst Drubig, Heidelberg, Josef Eisele, Altenfurth, and Georg J. Strattner, Nurnberg, Germany, and Günter Parow, Aldershot, Ontario, Canada, assignors to International Standard Electric Corporation, New York, N. Y., a corporation of Delaware Application February 20, 1952, Serial No. 272,676

9 Claims. (Cl. 317—234)

Object of the invention is a dry-plate rectifier-stack of rectifier plates without holes, especially for selenium rectifiers, which are provided with cooling plates.

It is known to construct rectifiers of single rectifier plates.

Mostly the assembly of single dry-plate-rectifiers into one rectifier-stack was carried out thus that the individual disks, perforated in the centre, were strung onto a bolt. For the current changeover from one disk to another one, contact elements too are strung onto the bolt between the disks. As rectifier plates are often strongly heated when being in operation, the individual plates were piled up with certain spaces, or even additional cooling plates were connected for the diversion of the arising heat. A part of the effective rectifier surface is lost by the central opening in the plates, therefore, it also has been tried to construct rectifier-stacks of rectifier plates without holes. Herewith the individual rectifier elements are mostly stored in a case.

These known arrangements still bring about many disadvantages. Such a rectifier-stack consists of numerous different component-parts and has mostly an insufficient cooling. The construction and assembly of such a stack is circumstantial and time wasting.

The rectifier stack, constructed in accordance with the invention, avoids these disadvantages. It is of a very simple construction and only very few and easy to manufacture parts are required. The stack has very good cooling properties and the assembly is simple and can be carried out quickly. By employing rectifier plates without holes, no loss of active surface arises. Owing to the very small and always constant assembling pressure, no paper-supports or other protecting coats are required. However, similar to the central contact rectifiers, an intermediate paper layer may be inserted onto, or underneath the selenium coating at those places, where the contact pressure is transmitted which by all means must be covered by the counter-electrode, respectively by the selenium coat plus counter-electrode.

But it is also possible to provide a strengthening of the counter-electrode spray-on, at those places, where the contact-pressure must be transmitted.

The rectifier-stack, according to the invention, is characterized by the fact, that the component-parts are kept together by frames of insulating material or strips, preferably bipartite ones and by two terminal-plates. No bolt, screw, riveted or soldered joints are necessary for assembling the rectifier-stack. The rectifier plates are supported in the frame of insulating material and are lying thereby appropriately near the cooling plates, serving the diversion of the generated heat. One or more spring-like flaps are punched out of these coling plates or from other intermediate plates, serving as contact elements to the next rectifier plate and, if necessary, these flaps at the same time can keep the different plates in a certain space, which is required for the heat diversion. But the arrangement may also be made like that, that the spacing is taken over by notches or slots etc. in the frame of insulating material, whilst the spring-like flap(s) in the cooling plates only serve the contact-making.

According to a further feature of the invention, the cooling plates are designed in such a way that the heat-delivery plates are situated outside the actual rectifier-stack. Two terminal-plates, introduced into the holding frames, combine the insulating-material-frame, the rectifier disks and possibly also the cooling plates, respectively the intermediate disks, to one solid unit. The terminal plates with their lower onsets or with suitable flaps or extensions, may serve at the same time for fastening the stack onto a support by using suitable onsets as crosswise flaps or so forth, or by applying a bolted connection. Likewise special shaft guides may be provided for these terminal plates at the ends of the holding frame, and this, preferably in such a way, that at a tight sitting and a large lay-on surface, every relative movement of both frames within the completed aggregate, is made impossible. As a current conductor to the aggregate, there are serving two plates of the shape and size of the rectifier plates which jut out of the aggregate with current-leading strips.

Type models of such stacks with the required component-parts are shown, by means of example, in the drawings, in which:

Fig. 6 is a front elevation of the terminal plates;

Fig. 7 is a front elevation and a ground plan of the insulating material frames, showing another form of the frames and an inserted rectifier plate and terminal plate;

Fig. 8 is a front elevation of the end of the frame without terminal plate;

Fig. 9 and Fig. 10 are ground views of other type models of frame slotting.

In all of the figures, the rectifier plates are designated with 1, the counter-electrode with 1a. Cooling plates are designated with 2, whilst the punched-out and bent-off elastical flaps for contact-making and for spacing between the disks, are marked with 2a. Furthermore there are no objections as to switching-in also other spring devices in the aforementioned cases, in order to ensure a contact pressure of the desired amount. In addition there are marked with 3 the insulating-material frames, with 5 the terminal-plates and with 4 the sheets or plates for the current connection and with 6 each of the insulating disks, with 7 and 8 parts of the insulating frames.

Figure 1:
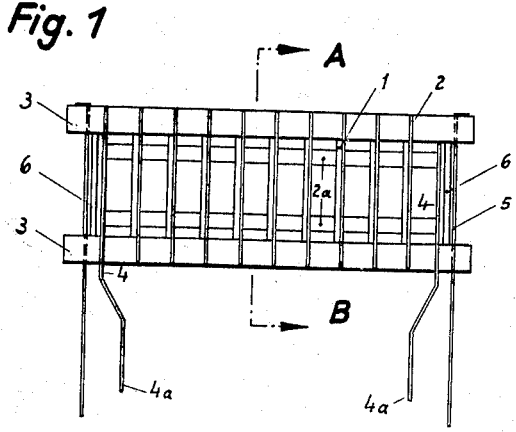
Fig. 1 is a view of the stack in front elevation according to the invention.

The arrangement of the different parts is given in side-view in Fig. 1. Rectifier plates 1 are in contact with the cooling plates 2 and are being kept on space by the punched-out contact spring 2a. It may be of advantage to let the rectifier plate together with the counter-electrode touch the cooling plate, and not the basic electrode. Contact plates with the current connecting-lugs 4a are arranged at the two ends of the arrangement. These are insulated from the ending plates 5 by insulating disks 6, which are of the same shape and at least of the same size like the rectifier plates. Both of the insulating material frames 3 hold together the whole stack with the terminal plates 6.

Figure 2:
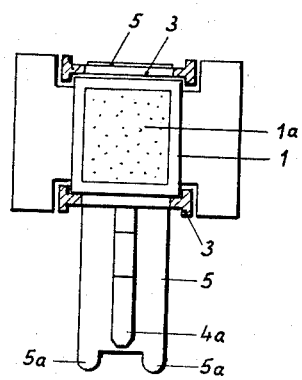
Fig. 2 is a view in section taken along lines A—B of Fig. 1.
Figure 3:
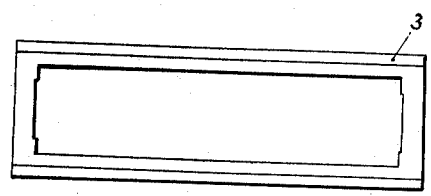
Fig. 3 is a view in ground plan and a side view of the insulating-material frames.

Fig. 2 shows a cut through the rectifier stack. Rectifier plate 1 is visible from the side of the counter-electrode 1a. At the edges and/or corners every rectifier disk is conducted in the frame of insulating material. Whilst quadrangular disks are represented in the figures (square disks), also plates with other shapes may be conducted in accordingly shaped frames with parts of their circumference, without further consideration. The cooling plates are standing out on the right and left hand side, so that at these parts an intensive cooling may be effected by an air current. Of contact plate 4 the connecting lugs 4a are to be seen. At the lower part of the terminal plate 5, two flaps 5a are earmarked for the fastening of the stack, whilst the angled-off part of the ending plate is lying on upper part of the insulating frame 3. A plan and an intersection of the frame of insulating material is given in Fig. 3.

The stack is assembled in the following manner: The rectifier plates 1 and the cooling plates 2 with the punched-out spring contact flaps 2a are inserted in the lower insulating frame. On the ends, the plates for the current connection 5 and the insulating disks 6 are inserted. The parts are held together and in the right position by the help of tongs or other mechanism. After the upper insulating frame is set up the terminal plates 5 are put in the special slots 8 and the upper ends of the terminal plates 5 are bent rectangularly.

Figure 4:
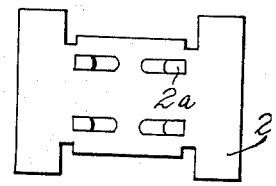
Fig. 4 is a view in ground plan and front elevation of the cooling plates.

The plan and side-view of a cooling-plate is given in Fig. 4. These cooling plates must be able to conduct the heat as well as also the electrical current. As suitable material may be regarded, for instance copper, brass or aluminium, respectively, also iron and surface protection. The punched-out spring contact-flaps may be bent in various manners. They either may be rectangularly folded or may be of the represented shape, which provides a more elastical support, or as simple straight springs which only lie on the front edge. Generally it should be endeavoured to obtain a rather large contact surface. But thereby, however, the heat-passage-contact between the rectifier plate and the cooling disk should not be too much impaired. The middle part of the contact plate is of shape and size of the rectifier plates. Cooling-wings are at the sides. With regard to a safe conduction within the frame of insulating material, slots are provided between these two parts.

Figure 5:
Fig. 5 is a front elevation of the sheets or plates for the current connection.
Figure 5:
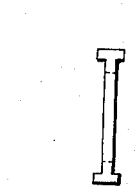

For the purpose of a better contact making with heat-delivery, plates or rectifiers, or both may have a rough structure on one or both surfaces. It is also possible, by means of a suitable coat of paint, according to the situation, however, to apply either a heat-reflecting, or heat-absorbing coating. The shape of the contact plates is represented in Fig. 5. They have shape and size of the rectifier plate and are provided with a connecting lug 4a. This may be folded in a suitable way. Such sort of connecting plates are generally used, one each, at the end of the stack.

For other circuits, however, connecting plates may also be provided in the middle of the stack. The cooling plates themselves may also be used for connecting. In Fig. 6 more connecting- or terminal plates are shown. They may, under certain circumstances, go straight through, but they can also as shown in Fig. 6, be provided with slots, which ensure a safe staying in the therefore provided abutting parts within the insulated material frames, and prevent any shifting of these frames against each other. The upper edge of the plate will be bent rectangularly either before or after inserting the plate into the frame.

A modified shape of the frame is represented in Fig. 7. Because in the frame there are slots or notches resulting from a simple saw-tooth shaped construction and which are designated with 7. Into these slots the rectifiers and the cooling disks 1 and 2 are inserted, so that the space of the slots or the sawtooth division determines the space of the disks. For the contact making a single elastical flap which has been cut out of the cooling plate will be sufficient. The ending plates 5 are conducted rather tightly in special slots 8 and will obtain in these slots, in the parts 3a, such a large supporting surface, that the relative position of the little frames towards each other is ensured. The end of the little frame without terminal-plate is again represented in Fig. 8. Under circumstances and according to the load, only every second, third etc. slot can be occupied with a rectifier disk. Other type models of frame-slotting are represented as examples in Figs. 9 and 10.

The rectifier stack in accordance with the invention, is composed of a few simple parts, which are easily to be manufactured in mass-production. After the assembly, the whole device may still be covered with an insulating coat, for example varnish, by means of spraying or dipping.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. A rectifier stack comprising a plurality of imperforate rectifying plates arranged in a stack, a pair of frame members arranged over opposite ends of the plates, and means holding said frames together including a pair of terminal plates, said frames having slots therein at the ends thereof and means securing said terminal plates in said slots.

2. A rectifier stack comprising a plurality of imperforate flat rectifying plates, a plurality of flat metallic cooling plates stacked with said rectifying plates with the flat surface of each rectifying plate bearing against the flat surface of a separate one of said cooling plates, means physically separating each pair of contiguous plates from the adjacent pair, and means holding said stack together, comprising a pair of insulating frames extending over opposite sides of the plates and terminal means fixing said frames together, said frames being provided with indentations in which the edges of the plates rest, said indentations serving as said separating means.

3. A rectifier stack comprising a plurality of imperforate flat rectifying plates, a plurality of flat metallic cooling plates stacked with said rectifying plates with the flat surface of each rectifying plate bearing against the flat surface of a separate one of said cooling plates, means physically separating each pair of contiguous plates from the adjacent pair, and means holding said stack together, comprising a pair of insulating frames extending over opposite sides of the plates and terminal means fixing said frames together, said terminal means comprising a pair of terminal plates, said frames having slots at the ends thereof into which said terminal plates are fixed.

4. A rectifier stack comprising a plurality of flat imperforate rectifying plates arranged one directly above the other and extending in different parallel planes, means separating each plate from the adjacent plates so as to leave air spaces between adjacent plates and means holding said stack together while permitting air to circulate through said air spaces comprising a pair of side insulating frames extending along opposite sides of the plates and covering only a fraction of the side area of the stack so as to allow cross ventilation across said sides, the other sides of the stack as well as the center of the stack being open so as to also allow cross-ventilation thereacross in the direction from one of said other sides to the opposite one of said other sides.

5. A rectifier stack according to claim 4 further including means for electrically connecting the bottom of each of said plates, except the bottom plate, to the top of the next succeeding plate, comprising a plurality of thin conductive contact elements each positioned between adjacent plates.

6. A rectifier stack according to claim 4 in which said elements are of bent spring metal and also serve as said separating means.

7. A rectifier stack according to claim 4 in which said means for separating the plates comprises indentations in said frames in which the edges of said plates rest.

8. A rectifier stack according to claim 7 further including means for electrically connecting the bottom of each of said plates, except the bottom plate, to the top of the next succeeding plates, comprising a plurality of thin conductive contact elements each positioned between adjacent plates, the opposite edges of each of said elements likewise being retained in said indentations together with the edges of said plates.

9. A rectifier stack comprising a plurality of rectifying plates, means separating each plate from an adjacent plate so as to leave air circulation spaces between said plates while electrically interconnecting said plates, and means holding said stack together while permitting air to circulate through said air spaces comprising a pair of insulating side frames extending along opposed edges of the plates and covering only a small fraction of the perimeter of the stack so as to allow cross ventilation between the plates, the center of the stack being open so as to permit said cross ventilation to take place.

References Cited in the file of this patent

UNITED STATES PATENTS

| | | |
|---|---|---|
| 2,083,647 | Gilson | June 15, 1937 |
| 2,090,806 | Osawa | Aug. 24, 1937 |
| 2,189,887 | Elsome-Jones et al. | Feb. 13, 1940 |
| 2,291,592 | Dowling | July 28, 1942 |
| 2,328,488 | Peters | Aug. 31, 1943 |
| 2,414,801 | Clarke | Jan. 28, 1947 |
| 2,482,817 | Vitrogan | Sept. 27, 1949 |
| 2,568,764 | Richards et al. | Sept. 25, 1951 |